Aug. 7, 1945.  F. T. POWERS  2,381,556
CASSETTE
Filed April 9, 1943  6 Sheets-Sheet 3

INVENTOR.
Frank T. Powers.
BY
Hobart N. Durham
ATTORNEY

Aug. 7, 1945.　　　F. T. POWERS　　　2,381,556
CASSETTE
Filed April 9, 1943　　　6 Sheets-Sheet 6

INVENTOR.
Frank T. Powers,
BY
ATTORNEY

Patented Aug. 7, 1945

2,381,556

UNITED STATES PATENT OFFICE 2,381,556

CASSETTE

Frank T. Powers, Glen Cove, N. Y.

Application April 9, 1943, Serial No. 482,455

8 Claims. (Cl. 250—66)

This invention relates to improvements in cassettes and relates more particularly to cassettes with provision for handling and exposing successive lengths of a long strip of sensitized material.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Objects of this invention are: to provide a new and useful cassette unit for X-ray radiography; to provide a cassette unit with which low cost paper film in continuous strip form may be employed to equal advantage with gelatine film as respects intimate contact with an intensifying screen over the entire exposure area and the presentation of a smooth flat surface to the X-ray beam; to provide a cassette unit for use with film in continuous strip form in which the film handling mechanism will be automatically and releasably locked coincident with stationing of a definite length of the strip in the exposure position; to provide a cassette unit for use in making successive X-ray radiographs of the respective members of a group, the members being of different heights, which will enable radiography of the same area of the respective individuals to be carried out while they are in an upright position, with greater precision and speed and in a more facile manner than has heretofore been obtainable; to provide a new and improved vacuum cassette unit; and, to provide a new and improved mobile floor type cassette unit of adjustable height.

In accordance with this invention, there is provided a carriage upon which the cassette is mounted for vertical adjustment relative thereto. The embodiment carriage is preferably of mobile construction so that it may be readily and easily moved by the operator to a desired location and comprises elevator means for raising and lowering the cassette to a desired height. The embodied elevator means is preferably a balanced mechanical system requiring but slight effort on the part of the operator to effect a change in elevation of the cassette.

The carriage additionally comprises suitable suction means operating through extensible duct means to educt air from and to reduce the pressure within the cassette at any setting of the latter.

The cassette as embodied comprises a relatively light weight but structurally rigid, air-tight and light-tight casing which is also impervious to X-ray except through an X-ray permeable exposure window of suitable dimensions provided therein.

Access to the cassette, for loading the cassette with a fresh supply of film, or for removing exposed film, is obtained through the rear of the casing which is provided with an air-tight removable or hinged rear wall for this purpose.

The cassette embodies means for handling film, in the form of a long strip of sensitized material, by which successive equal lengths of the strip may be stationed in the exposure position for exposure to X-rays through the exposure window. The embodied film handling means comprises winding reels for holding the supplies of fresh and used film, together with guide rollers and winding means for winding the film off one reel and onto the other along a path passing through the exposure position.

Means are provided within the casing for automatically locking the winding means coincident with the stationing of a length of the film strip in the exposure position. The embodied locking means comprises detent means contacting one edge of the film strip so as to hold off the locking means while a length of the film strip is being moved into the exposure position. Notches provided along the edges of the film strip at equal intervals, are adapted to coact with the detent means upon arrival of each length in the exposure position and permit movement thereof serving to immobilize the winding mechanism in releasable fashion.

The successive notches are situated so that locking of the winding mechanism will coincide with correct stationing of a length of the film strip in the exposure position. These notches are preferably coincident with the respective division lines between the successive equal lengths of the film strip. These division lines are preferably in the form of weakened severance lines running transversely of the film strip and enabling an exposed length, or lengths, of the film strip to be readily detached from the film strip without having to remove the unexposed portion of the film strip from the cassette.

Means are provided for holding a length of the film strip, stationed in the exposure position, against the window member. The embodied holding means comprises a press-board which is faced with an intensifying screen and is movable from the exterior of the casing into and out of the holding position in which the length of film strip is engaged by the intensifying screen and held thereby against the window member.

The exposure window is of a thin flexible nature so that a reduction in the air pressure within the cassette will cause the window member to exert a pressure substantially uniformly over the entire area of the length of film strip held by the screen against the window. This ensures intimate contact of the held length with the intensifying screen over the entire exposure area with consequent smoothing out of minor curls, buckles, etc., particularly in the case of paper film which is thereby caused to present a smooth, flat surface to the X-ray beam.

Suitable valve means are provided for controlling the eduction of air from the cassette. Such valve means are preferably actuated by the screen moving mechanism so as to permit eduction of air from the cassette only while a length of the strip is held against the exposure window.

Referring now more particularly to the accompanying drawings, a casing 1 of the cassette is mounted on an elevator platform 2 of the carriage from which legs 3 depend into a housing 4 of the carriage. The casing 1 of the cassette and housing 4 of the carriage, respectively, comprise top, bottom, front, back and end walls, the cassette having provision for handling and exposing successive lengths of a long strip of X-ray film, and the carriage having provision for raising, lowering and counter-balancing the cassette and for establishing a reduced pressure within the cassette, all as will be described more fully hereinafter.

The casing 1 is suitably anchored to the platform 2 as by bolts 5. Likewise, the platform is anchored to the legs 3 as by screws 6.

The legs 3 pass through openings 7 of matching contour in the top wall of the housing 4, the legs and openings being so positioned and arranged that the legs preferably just slidably engage the opposite end walls of the housing therewithin. The legs are braced at the bottom by means of plates 8, preferably of metal, lodged in slots 9 in the leg ends, each plate serving to connect a pair of legs adjacent one end wall. Suitable fastening means such as the bolts 10 passing through the respective legs of each pair and its connecting plate, serve to secure one to the other.

Means operable from the exterior of the carriage are provided for raising and lowering the platform 2 and with it the cassette. As here embodied, a shaft 11 positioned in the upper part of the housing 4 is journalled at either end in the housing end walls, for axial rotation. One end of the shaft extends through an end wall of the housing and is equipped with an operating handle 12 exteriorly of the housing. A pair of reels 13 fixed to the shaft 11 is connected by metal ribbons 14 to subjacent metal arms 15 suitably secured to the bracing plates 8. Each of the ribbons 14 is anchored at its upper end to a respective reel 13 so as to be wound thereon on rotation of the shaft 11 and is anchored at its other end to a respective arm 15. Thus, as the shaft 11 is rotated in one direction, the platform 2 and with it the cassette will be raised, and vice versa.

In order to facilitate ease of manual operation and to stabilize the cassette at any desired height, suitable counter-balancing means are provided. As here embodied, a winding reel 16 affixed to the shaft 11 has connected thereto one end of the tensioned metal ribbon 17 of a so-called "Rochester Sash Balance" unit 18, anchored to the bottom wall of the housing 4. It will be understood that the torque applied to the shaft 11 by the unit 18 through the ribbon 17 is at all times sufficient in magnitude and direction substantially to counter-balance the torque due to the weight of the cassette, the platform 2 and related parts.

Figures 2, 3:
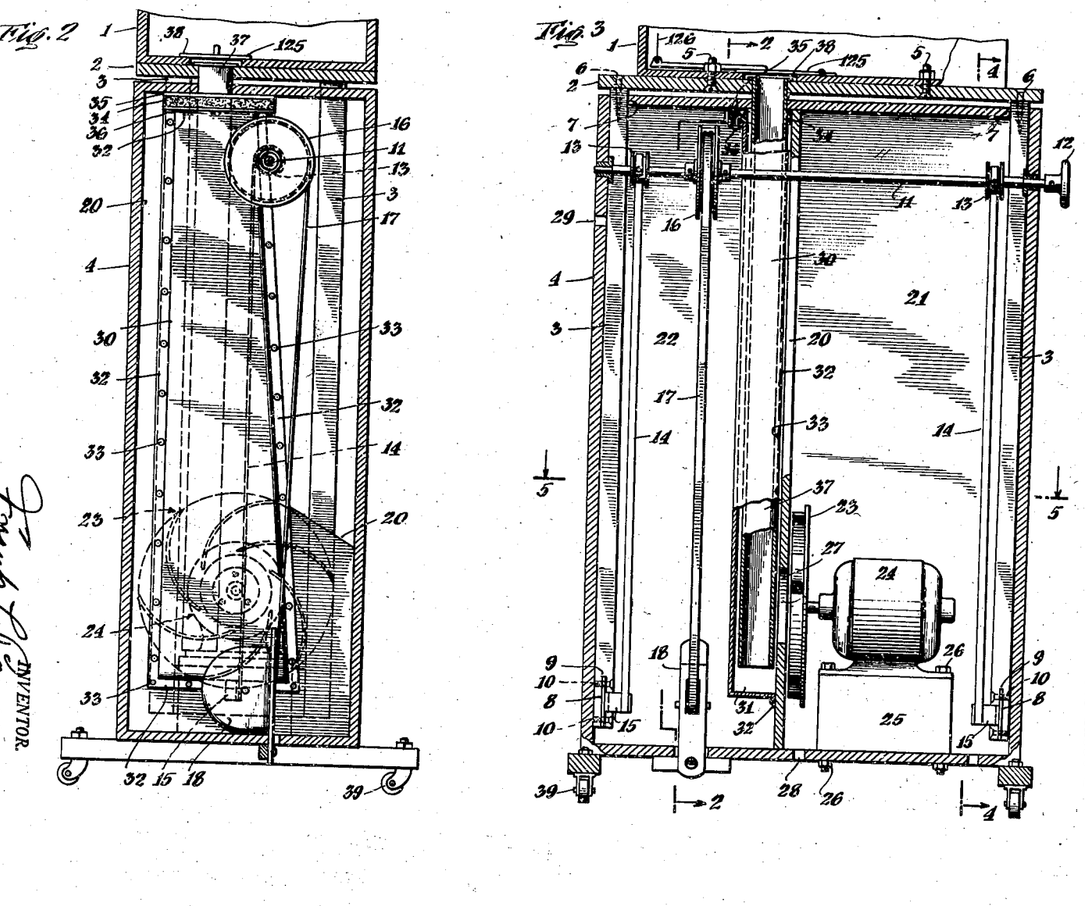
Fig. 2 is a sectional view of the interior of the carriage and a portion of the interior of the cassette, taken along the line 2—2 of Fig. 3; the view depicting certain details of the pressure reducing system and of the height adjusting system.
Fig. 3 is a sectional view similar to that of Fig. 2 but taken along a plane at right angles to that of Fig. 2.
Figure 4:
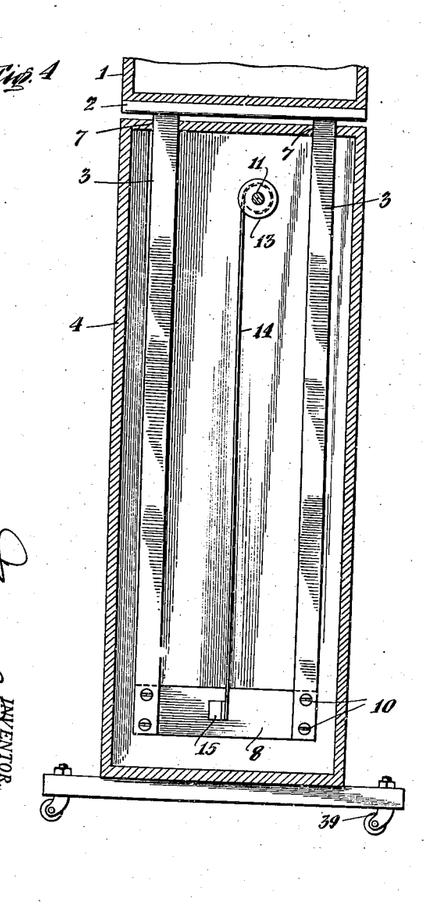
Figs. 4 and 5 are sectional views taken along the lines 4—4 and 5—5, respectively, of Fig. 3.
Figure 5:
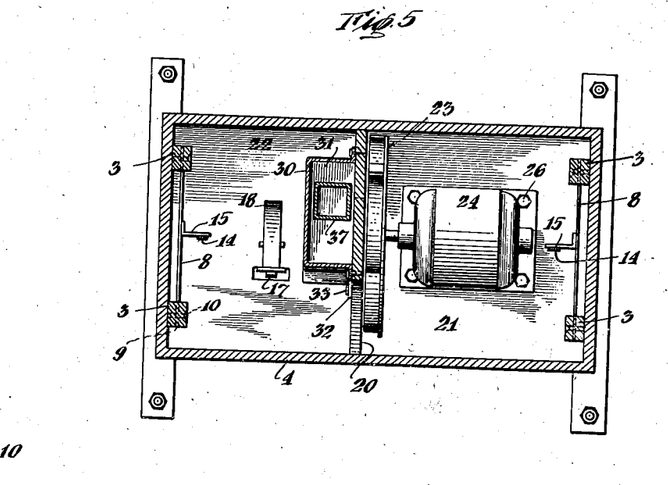

Means are provided for reducing the pressure within the cassette so as to establish a pressure differential between the interior and exterior of the casing, during exposure. As here embodied, the housing 4 is provided with a vertical partition member 20 generally dividing it, as viewed in Fig. 3, into right and left hand compartments 21 and 22, respectively, for the reception of suitable suction means and duct means, respectively.

The compartment 21 is provided with a suitable suction pump 23 such, for example, as the rotary centrifugal fan 23 which is directly driven by a suitable prime-mover such, for example, as the electric motor 24. The motor 24 is carried on a pedestal 25 secured in suitable fashion, as by bolts 26, to the bottom wall of the housing, the disposition being such as to permit the fan 23 to take suction through a suitable opening 27 in the partition member 20. Vent openings 28 in the bottom wall of the housing are provided for the escape of air discharged by the fan 23.

The partition member 20 is suitably contoured snugly to fit within the confines of the housing 4 and is preferably cut away at the front so as to provide a passage between the compartments 21 and 22 which latter may be vented, as at 29, for the escape of air discharged by the fan 23. The partition member may be adhesively bonded or otherwise suitably secured at its edges to the walls of the housing.

A duct member 30, preferably of sheet metal, is secured to the partition member 20 within the compartment 22 and forms therewith a suction duct 31 including the pump intake opening 27. The member 30 may be of any suitable configuration but as here embodied is generally U-shaped in cross-section and of trapezoidal outline, is closed at the bottom and open at the top and is provided with edge flanges 32 suitably apertured for the passage of screws 33 securing it to the partition member 20. The duct member 30 terminates at its top short of and in spaced relation to the top wall of the housing 4. In the space thus provided, there is received in superposed relation a sealing washer 34, preferably of felt, of annular outline and a washer 35, preferably of metal, of U-shape. The sealing washer 34 is held between the duct member 30 and the washer 35 in a slightly compressed state by means of nails 36 which pass through the top edge flange 32 of the duct member and through the washers 34 and 35, into the top wall of the housing.

A duct member 37, open at its top and bottom, passes through the platform 2, through the top wall of the housing 4 and through the felt washer 34 and is telescopically received within the duct 31. The duct member 37 is sealingly engaged and securely held by the platform 2 and opens at its top and through a valved opening 38 into the casing 1. The washer 34 forms a substantially air-tight seal with the duct member 37. Gaskets (not shown) of rubber, cork or other suitable sealing devices may be provided, if necessary, at the opening 38 and/or between the contiguous junction surfaces of the cassette and platform, further to seal the various joints. Thus, it is apparent that the fan 23 will operate to educt air from, and reduce the pressure within, the interior of the cassette via the opening 38, duct member 37, duct 31 and aperture 27. Further, it is apparent that by virtue of the telescopic arrangement of the duct member 37 in the duct 31, this eduction may be effected at any platform setting so that the cassette may be used over a wide range of heights. The carriage is preferably provided with casters 39 or other suitable means for facilitating moving of the cassette unit to a desired location.

The casing 1 is opaque to light, is air-tight and is lined with a lead shield (not shown) except over the exposure area formed by an X-ray permeable window member 42, so as to be impervious to X-rays. As here preferably embodied, the bottom, end and back walls of the casing are fashioned of wood, the back wall being removable and sealingly engaging the top, bottom and end walls of the casing in a light-tight, air-tight fashion. An adjustable steady brace 40 with a roller at its end adapted to bear against a room wall or other vertical surface against which the cassette unit may be positioned when in use, is provided on either end wall of the casing 1. The roller is adapted to roll up and down the wall when the cassette is adjusted in height.

The front wall of the casing is formed by a vertical portion 41 preferably of wood, which rises from and terminates a short distance above the bottom wall of the casing and provides a support for the window member 42 of material, such, for example, as a thin sheet of Bakelite, which is opaque to light but permeable to X-rays. The thickness of this window member may be of the order of $\frac{1}{32}$ inch.

The window member 42 is secured at its top to the top wall of the casing which is preferably metal and which is provided with depending marginal flange portions 43. The front marginal flange masks the window member down to the top margin of the exposure area and is secured to the window member as by screws (not shown). The end marginal flanges are secured to the end walls of the casing in a similar manner. Corner members 44, preferably of metal, similarly mask the window member 42 at the sides and are anchored to the window member and to the respective end walls of the casing as by screws, not shown. Similarly, the front wall portion 41 is faced with a metal plate 45 which overlaps and masks the window member 42 at its bottom margin and completes the outlining of the exposure area of the window member. The window member 42 is sufficiently flexible to permit an inward flexing thereof under a pressure reduction within the casing of, for example, two and one-half ounces per square inch of window area. The casing is preferably lead lined except for the window member for the protection of the X-ray sensitive film against fogging.

Means are provided for holding a measured length of X-ray sensitive material in continuous strip from, stationed in the exposure position against the window member 42. As here embodied, a pressboard 46 is supported in brackets 47 secured to the front wall of the casing, for movement into and out of the supporting position, by means of coaxial rollers 48 received within slots 49 in the brackets 47.

A rigid backing member 50, preferably fashioned of plywood, has its front face shielded with a sheet of lead 51 of a thickness preferably in the order of one-sixteenth of an inch. The lead sheet 51 in turn is faced with an intensifying screen 53 which is cemented or otherwise suitably affixed thereto.

Stiffening of the pressboard is effected through the provision of metal straps 54 which are secured to the rear face of the backing member 50 as by bolts 55, the backing member being similarly reinforced and stiffened at its top and bottom by transverse metal straps 56 screwed thereto. The extent of rearward movement of the pressboard 46 is limited by bracket members 57 secured to the casing end walls and extending inwardly of the casing and rearwardly of the pressboard.

A shaft 60 is journalled at either end in suitable anti-friction bearings 61 in the casing end walls. One end of the shaft 60 carries a crank 62 secured thereto externally of the casing whose arc of movement is fixed by a pair of lugs 63 corresponding to the engaged and disengaged positions of the pressboard. Arms 64 are carried by the shaft 60 in spaced relation to each other, the arms being of suitable length so as to engage the pressboard 46 and to move the pressboard forward and to lock the pressboard in its most forward position upon completion of the permitted counter-clockwise movement of the crank 62, as viewed in Fig. 1.

A retracting bar 65 connects the arms 64 at the rear of the pressboard, the bar 65 being in spaced, parallel relation to the shaft 60 and being lodged in a U-shaped socket formed by a socket member 66 with the pressboard. The socket member 66 is screwed or otherwise suitably anchored to the pressboard and it will be apparent that the retracting bar 65 will engage the bracket 66 so as to move the pressboard out of the engaged position upon clockwise movement of the shaft 60.

Means are provided for storing a fresh supply of X-ray film within the cassette in the form of a long strip and for successively positioning measured successive lengths of the strip within the cassette for exposure to X-rays through the exposure window. As here embodied, slotted bearing members 70, preferably of fibrous material, are secured to the opposite end walls of the casing, each of the bearing members being provided with a downwardly and inwardly inclined slot 71. The bearing members 70 are adapted to support, substantially centrally of the cassette, a reel 72 carrying a fresh supply of the X-ray film. The reel 72 may be of usual construction having coaxial stub shafts 73' extending from either end and received within the open ended slots 71 of the bearing members.

Figure 6:
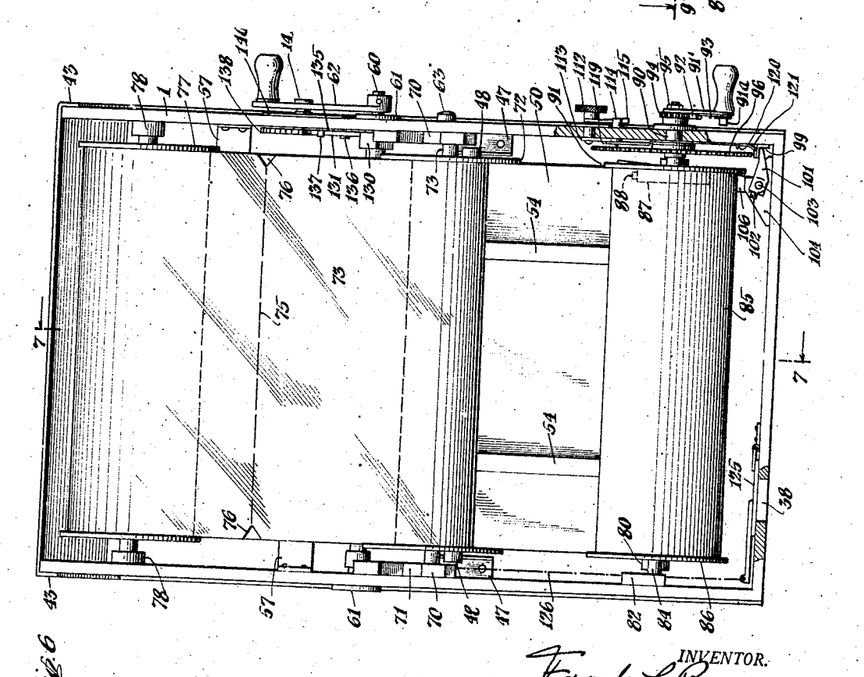
Fig. 6 is a view in rear elevation of the cassette of the embodiment of Fig. 1, the back wall being omitted to show the internal structure.

The supply of X-ray film is in the form of a long strip 73 which may be transparent film but is preferably sensitized paper. The strip 73 wound on the reel 72 is divided into equal successive lengths, each length being joined to its adjacent lengths along a weakened severance line 75 (Fig. 6). Thus a length or succession of lengths may be easily and readily separated from the strip after exposure or at will, without unwanted tearing of the strip and without the use of a knife or similar severing means. Additionally, the strip is suitably notched along both edges at each severance line, as at 76, for coaction with automatic locking means to be described more fully hereinafter, so that the operator will be apprised as to when each length of film is properly located in the exposure position and the strip will be locked against further movement pending release of the locking mechanism by the operator.

To these ends and as here preferably embodied, there is provided within the upper portion of the cassette, an idler guide roller 77 traversed by the strip 73, the roller 77 being journalled at either end in bearings 78, preferably of fibrous material, secured to the respective end walls of the casing. The guide roller 77 is of relatively large diameter and is preferably formed with a wooden core having end flanges of larger diameter which may be of Bakelite. The guide roller of relatively large diameter tends to smooth out buckles in the strip 73 as it passes over the roller and to fix the position of the strip laterally within the cassette in transit.

Upper and lower guide rollers 79 and 80 of smaller diameter are positioned above and below, respectively, the press-board 46 and serve to guide the strip in a substantially vertical and linear path between the intensifying screen 53 on the pressboard 36 and the window member 42. The rollers 79 and 80 are journalled at their respective ends in suitable bearings, the roller 79 being journalled at either end in the bearing members 78 and the roller 80 in bearings 81 secured to the casing end walls.

Winding means are provided in the lower portion of the cassette for drawing the film strip through the exposure position and for storing the film strip as it is used. As here embodied, a slotted bearing member 82 which is secured to the right hand end wall of the casing and is preferably formed of fibrous material, is provided with a downwardly and forwardly inclined slot 83. The slot 83 is adapted to receive a stub shaft 84 of a take-up reel 85 having an end flange 86 at its stub shaft end only. The opposite end of the reel is provided with a recess (not shown) preferably of cylindrical contour adapted to receive a hub 87 of matching contour.

The hub 87 is provided with a lug 88 extending radially outwardly from the circumferential periphery of the hub for lodgement in a radial recess of matching contour in the recessed end of the reel 85.

A hub shaft 89 is journalled in a suitable anti-friction bearing member 90 in the left hand end wall of the casing and carries the hub 87 which threadedly engages the hub shaft in concentric relation thereto.

An annular hub flange 91 concentric with the shaft 89 is bolted to the hub 87 between it and the bearing member 90. Thus, with the take-up reel 85 supported at one end by the shaft 84 in the bearing member 82 and supported at the other end by the hub 87, the hub flange 91 will complete the reel assembly and function to guide the film strip 73 onto the reel as the shaft 89 is turned. At the same time, separation and removal of the reel from its end supports may be readily effected when necessary.

Figure 7:
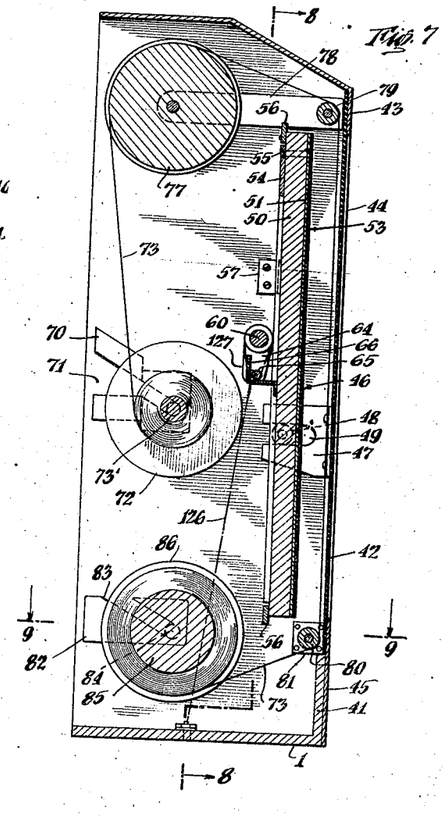
Fig. 7 is a sectional view taken along the line 7—7 in Fig. 6.
Figure 8:
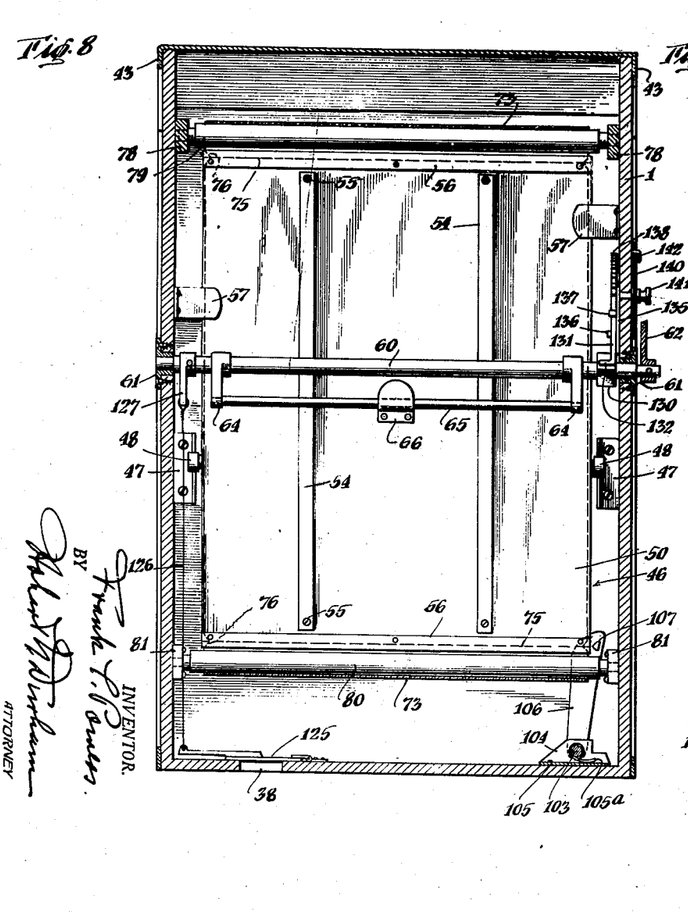
Fig. 8 is a sectional view taken along the lines 8—8 of Fig. 7.
Figure 9:
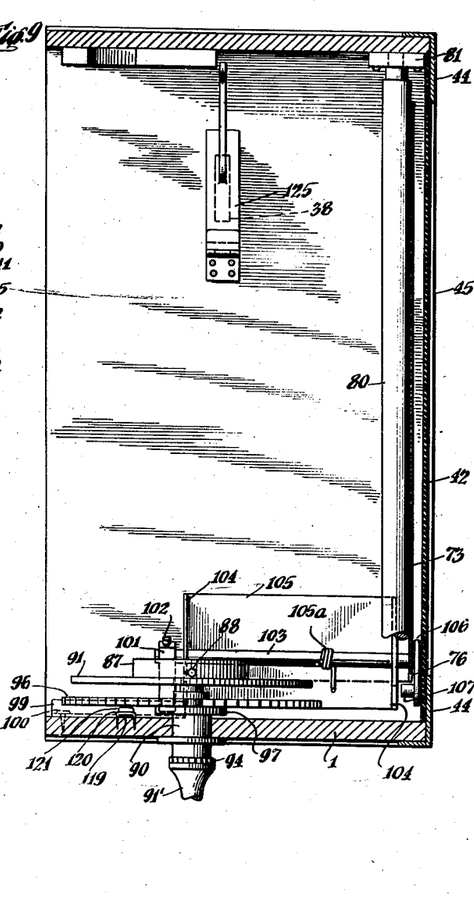
Fig. 9 is a sectional view taken along the line 9—9 in Fig. 7, the lower winding reel shown in Fig. 7 being omitted and certain of the parts being broken away better to show certain details.

A crank 91' is journalled on the outer end of the shaft 89 and is provided with a pawl 92 which is urged by a spring 93 into operative engagement with a ratchet wheel 94 anchored to the shaft 89. A nut 95 threadedly engages the outer end of the shaft 89 for preventing axial movement of the crank 91' on shaft 89. The crank 91' is, by reason of the pawl-ratchet construction, operative to rotate the shaft 89, and hence the take-up reel 85, in a clockwise direction only, as viewed in Fig. 7. It will be seen that rotation of the crank 91' serves to pull the film strip through the exposure position and wind it on the reel 85.

Means are provided for automatically locking the winding means coincident with the stationing of each successive length of film strip in the exposure position. As here embodied, a ratchet wheel 96 coaxial with the shaft 89 is bolted to an annular flanged coupling member 97 which in turn is firmly anchored by a pin 98 to the shaft 89. A ratchet pawl 99 is positioned below the ratchet wheel 96 and extends fore and aft in the cassette 1, the pawl being pivotally mounted on a pin 100 extending inwardly from the adjacent end wall of the casing.

The ratchet pawl 99 is adapted to be automatically lifted into releasable locking engagement with the ratchet wheel 96 by a pawl lifting arm 101 coincident with the stationing of each successive length of film strip in the exposure position.

The pawl lifting arm 101 is secured by a set screw 102 to one end of a rocker shaft 103 positioned in the lower portion of the casette and paralleling the casing end walls. The shaft 103 is journalled intermediate its ends in parallel upstanding bearing arms 104 of a bearing member 105 secured to the bottom wall of the casing. A coil spring 105a surrounds the shaft 103 between the arms 104 and operates to urge the rocker shaft 103 and lifting arm 101 counter-clockwise, as viewed in Fig. 11, thereby urging the ratchet pawl 99 upward into locking engagement with the ratchet wheel 96.

The rocker shaft 103 carries at its front end a lever arm 106 which extends radially upwardly from the shaft 103 adjacent the front wall of the casing. The lever arm 106 is provided at its upper end with a dog 107, preferably a roller, adapted to be lodged in the respective notches 76 of the film strip 73.

The dog 107 is normally urged toward the film strip upon whose edge it normally rides, by the coiled spring 105a acting through the rocker shaft 103 and the lever arm 106 and hence dog 107 is caused to enter the respective notches 76 when in opposition thereto. Entry of the dog 107 into a notch actuates the ratchet pawl 99 so as automatically to lock the ratchet wheel 96, and hence crack 91 against further rotation. Thus, the operator is apprised of the correct stationing of a fresh length of film strip in the exposure position.

Means are provided, operable from the exterior of the casing, for releasing the locking mechanism at will. As here embodied, a shaft 110 is journalled in a bearing 111 in the casing side wall. The shaft is provided at one end exteriorly of the casing with a suitable operating handle 112 secured thereto and terminates at its opposite end interiorly of the cassette in a cam member 113 rotatable therewith. A stop member 114 on the casing is adapted to be engaged by an arm 115 of the handle 112 and to limit the angular movement of the shaft in one direction.

A lever arm 116 is positioned within the cassette above the shaft 89 and is fulcrumed at its front end, as at 117, to the casing side wall in subjacent relation to the cam member 113 by which it is adapted to be engaged and moved downwardly about the fulcrum 117. The lever arm 116 is pin connected at its opposite end as at 118, to a substantially vertically extending depressor arm 119 which slidably engages the adjacent casing side wall and passes through a guide member 120.

Figures 10, 11, 12:
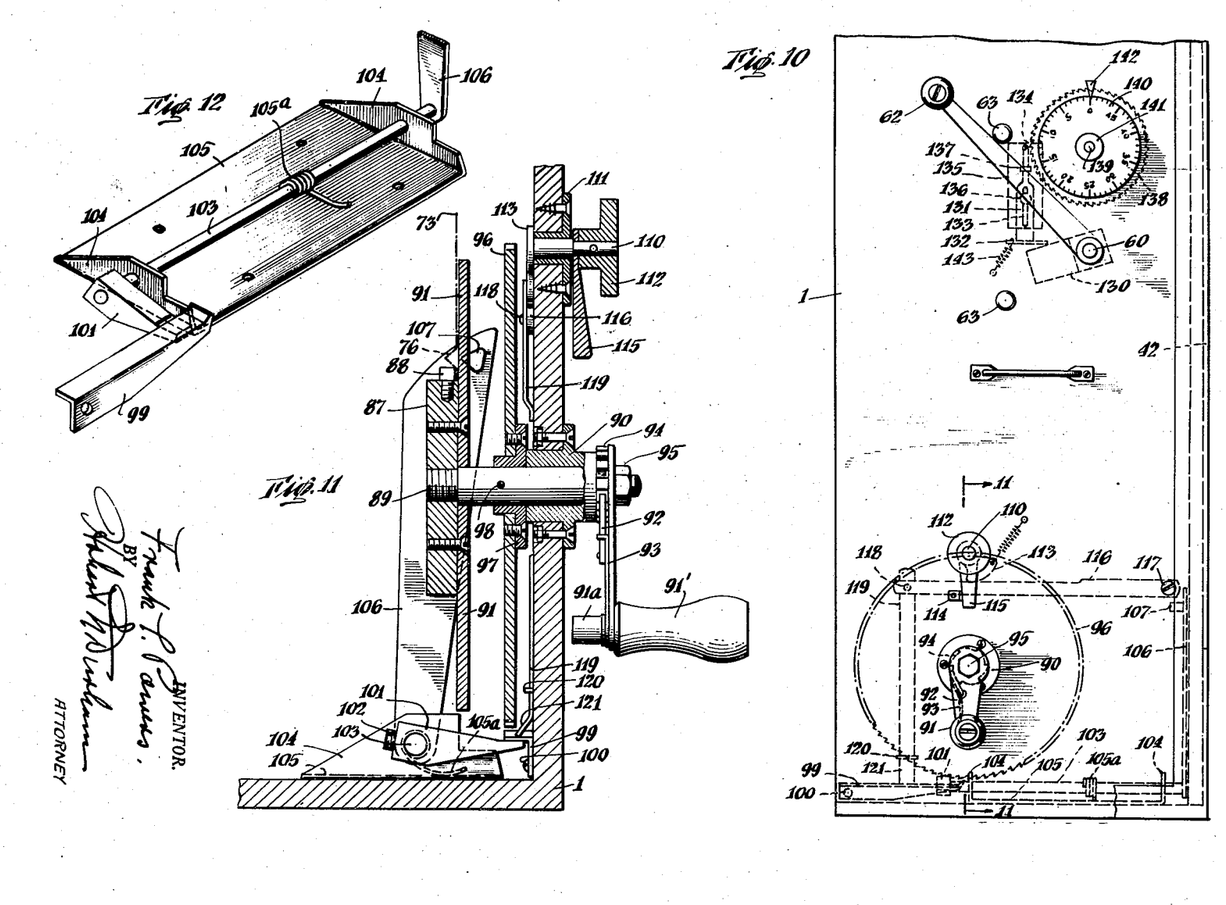
Fig. 10 is a view in elevation of a portion of the left end wall of the cassette of Fig. 1, as viewed in Fig. 1, the view also depicting in shadow outline certain details of the film handling mechanism of the cassette.
Fig. 11 is a view in section of certain details of the film winding mechanism taken along the line 11—11 of Fig. 10.
Fig. 12 is a view in perspective of a detail of Fig. 11.

The depressor arm 119 is angled inwardly at its lower portion as at 121 so as to bear upon the top of the ratchet pawl 99 which it is adapted to depress. In the arrangement of the parts as shown in Figs. 10 and 11, for example, the cam member 113 is positioned in the "release" position in which lever arm 116 has been moved downwardly about fulcrum 117 and depressor arm 119 has been forced down by the lever arm 116 so as to depress the pawl 99 thus freeing the ratchet wheel 96. Depression of the pawl 99 has rotated the pawl locking arm 101 and in consequence has effected a withdrawal of the dog 107 from the film strip notch 76. Thus, the film strip is freed and winding thereof on the reel 85 may be accomplished by rotating the crank 91. It will be observed that as winding proceeds, the dog 107 will ride on the edge of the film strip and the pawl lifting arm 101 will be prevented from lifting the ratchet pawl 99 into engagement with ratchet wheel 96 until the next positioning notch arrives opposite the dog 107. Once winding has been initiated by rotation of the crank 91, the cam number 113 will be rotated by the engagement of an extension stud 91a on the handle 91' with the arm 115, thus rotating cam 113 out of engagement with the lever arm 116, so as to permit automatic locking of the winding mechanism upon arrival of the next notch opposite the dog 107. Or the movement of the cam 113 may be effected manually by turning the handle 110 counter-clockwise. If desired, the cam member 113 may be provided with spring means (not shown) for automatically restoring the cam member to its starting position upon release by the operator.

Means are provided for automatically establishing a reduced pressure within the cassette upon movement of the intensifying screen 53 into engagement with the length of the film strip stationed in the exposure position. As here embodied, a spring actuated hinged flap valve 125 within the cassette is mounted on the bottom wall of the casing 1 for closing the evacuating port 38. The valve flap is connected by a flexible link 126, such, for example, as a wire, chain or the like to a valve operating lever 127 on the shaft 60.

The lever 127 extends radially from the shaft 60 at such angle that the rotational movement of the shaft 60 by which forward movement of the intensifying screen is effected will impart tension to the link 126 sufficient to raise the flap valve and uncover the port 38. The suction of the fan 23 applied to the interior of the cassette through the opening 38 reduces the air pressure within the cassette and causes the flexible window member 42 to exert a pressure substantially uniformly over the entire area of the length of film strip held by the screen against the window member. In consequence, intimate contact of the length of film strip with the intensifying screen is obtained over the whole exposure area and the length is caused to present a smooth flat surface, free of curls, buckles and warpings to the X-ray beam. This is of major importance in connection with paper film which is subject to warping and buckling under ordinary conditions of use. When the intensifying screen is retracted, the valve 125 is lowered and closes the suction port 38.

Means are provided for indicating the number of successive lengths of the film strip which have passed through the exposure position. As here embodied, the shaft 60 is provided with a lever arm 130 for lifting a dial actuating member 131 as is best shown in Fig. 10. The member 131 is provided at one end with a flange portion 132 at right angles thereto and is longitudinally slotted as at 133. The opposite end is preferably provided with a spring-loaded pawl 134.

A mounting plate 135 is secured within the cassette to an end wall of the casing and is provided with an outstanding stud 136 which extends through the slot 133 of the member 131. A guide strap 137 on the plate 135 embraces the member 131 above the pin 136 so as to confine the member 131 to movement in a substantially vertical linear path.

A ratchet wheel 138 within the cassette is mounted on one end of a shaft 139 journalled in and extending through one of the casing end walls. A counter dial 140 is secured to the outer end of the shaft 139 which is additionally provided with a knob 141 for setting the dial 140 to a zero setting with reference to a pointer 142.

The ratchet wheel 138 is suitably positioned with reference to the dial actuating member 131 so that upward movement of the member 131 will cause the pawl 134 to engage the ratchet 138 and move the dial 140 over one space relative to the pointer 142.

A spring 143 is connected to the member 131 and the casing so as to be tensioned by upward movement of the member 131 and to restore the member to its starting position as the lever 130 is moved away from the flange portion 132 and the intensifying screen is advanced.

It is therefore apparent that retracting of the intensifying screen after each exposure will advance the counter dial 140 one space, thus providing a measure of the number of lengths of film strip exposed.

As an illustration of the operation of this invention, the cassette unit loaded with a fresh supply of film in the manner hereinbefore described, is positioned in the desired location facing the X-ray generating apparatus and the person or subject to be X-rayed is positioned in front of and against the window member 42 of the cassette. In making radiographs of a person's chest, for example, differences in height of different individuals are readily and easily compensated for by raising or lowering the cassette to the proper height by turning the knob 12, Fig. 3, so as to obtain the desired setting. The vacuum fan 23 is then started by closing the starting switch (not shown) to the motor 24.

With the cam 113 in the position shown in Fig. 10, in which the dog 107 is retracted from the notch 76, the operator turns the crank 91 clockwise to wind the film strip from the reel 72 onto the reel 85. In doing so, the stud strikes the cam lever 115 which is rotated out of engagement with the lever arm 116. The film strip 73 which is engaged along its one edge by the dog 107 holds the lever arm 106 in a cocked position. In this position, the ratchet pawl 99 is held disengaged from the ratchet wheel 96. Winding of the film is continued until one of the notches 76 comes opposite the dog 107. When this happens, the dog 107 enters the notch, and the ratchet pawl 99 is lifted by the pawl lifting arm 101 into engagement with the ratchet wheel 96 which is thereby locked against further rotation. This completes the stationing of a fresh length of the film strip in the exposure position.

Figure 1:
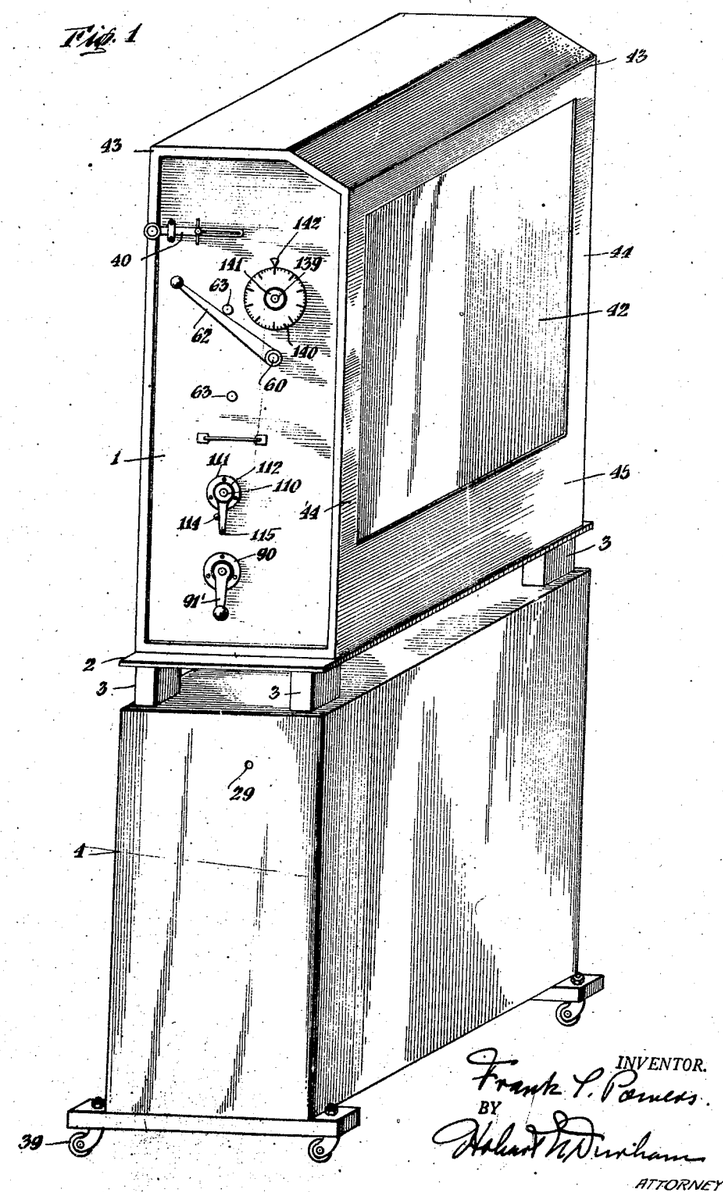
Fig. 1 is a view in perspective of a vacuum cassette unit constituting a typical and illustrative embodiment of this invention, the cassette unit comprising relatively vertically adjustable upper and lower units of which the upper unit embodies provision for handling and exposing sensitized material in continuous strip form, which will herein be referred to as the cassette, and the lower unit embodies provision for mobility of the cassette unit, for establishing a reduced pressure in and for raising, lowering and counter-balancing the cassette, which lower unit will herein be referred to as the carriage.

The crank 62 is now pulled down from the position shown in Fig. 1 to a position against the lower stop member 63. By so doing, the pressboard 46 carrying the intensifying screen 53 is advanced and locked in its most forward position by the lever members 64. As the pressboard is locked in position, the flap valve 125 is opened thereby permitting the vacuum fan to apply suction to the interior of the cassette.

The reduced pressure causes the flexible window member 42 to press the held length of film strip firmly against the intensifying screen over the entire exposure area and exposure may be made at any time thereafter.

Upon completion of the exposure, the crank 62 is returned to its starting position, thereby retracting the intensifying screen, advancing the counter dial 140 one space and closing the flap valve 125 to cut off the suction.

The release knob 112 is now rotated to the position against the stop member 114 shown in Fig. 1, so as to free the winding mechanism and retract the dog 107 from the notch 76.

The take-up reel is now rotated by the crank 91 so as to draw a fresh unexposed length of film strip into the exposure position. The release knob 112 will be returned to its starting position by contact of stud 91a with arm 115 and winding is continued until the dog 107 enters the next succeeding notch 76 of the film strip. Upon the happening of this event, the ratchet wheel 96 is locked against further rotation and the operator is apprised of the readiness of the apparatus for repetition of the exposure cycle.

The invention in its broader aspects is not limited to the specific mechanisms shown and described but departures may be made therefrom within the scope of the accompanying claims without departing from the principles of the invention and without sacrificing its chief advantages.

What is claimed is:

1. A cassette unit comprising in combination a carriage, said carriage comprising a housing, air eduction means within said housing, and elevator means; and, a vacuum cassette supported by said elevator means for vertical movement relative to said housing, said cassette communicating with said eduction means.

2. A cassette unit comprising in combination a mobile carriage, said carriage comprising a housing, a platform mounted for vertical reciprocable movement relative to said housing, and a vacuum pump in said housing; and, a vacuum cassette mounted on said platform, said cassette comprising a casing having a suction port for the eduction of air from said cassette by said pump, and valve means for opening and closing said port.

3. A vacuum cassette comprising an air-tight casing having a suction port and a flexible X-ray permeable window, means for handling film in the form of a long strip of sensitized material for the exposure of successive lengths thereof to X-rays through said window, means for holding a length of said strip stationed in the exposure position against said window, and valve means for sealing said suction port, said valve means being responsive to movement of said holding means to open and close said suction port.

4. A cassette comprising a casing having an X-ray permeable window; means for handling film in the form of a long strip of sensitized material for the exposure of successive lengths thereof to X-rays through said window, said means comprising winding reels and means motivated by said film strip for releasably locking one of said reels coincident with the stationing of a length of said strip in the exposure position.

5. A cassette comprising a casing having an X-ray permeable window; winding reels in said casing; means for winding film in the form of a long strip of sensitized material from one to the other of said reels for exposure of successive lengths thereof to X-rays through said window; means motivated by said film strip for automatically locking said winding means upon the stationing of a length of said strip in the exposure position; and, manually operated means for releasing said locking means.

6. A cassette comprising a casing having an X-ray peremable window; winding reels in said casing; means for winding a long strip of film from one to the other of said reels for exposure of successive lengths of said strip to X-rays through said window, said film strip being provided with notches along one edge between adjacent lengths of said strip; means motivated by said film strip for automatically locking said winding means upon the stationing of a length of said film strip in the exposure position, said locking means comprising a spring-pressed detent member adapted to ride in a cocked position upon the notched edge of said film strip between said notches and to be uncocked by entry into the respective notches so as to lock said winding means; and, manually operated means for cocking said detent member so as to unlock said winding means.

7. A vacuum cassette comprising an air-tight casing having an X-ray permeable window; winding reels in said casing; means for winding film in the form of a long strip of sensitized paper from one to the other of said reels for exposure of successive lengths of said strip to X-rays through said window; a guide roller of relatively large diameter over which said strip is adapted to travel; means for holding a length of said strip stationed in the exposure position against said window; a valved suction port through which air is adapted to be educted from the cassette to reduce the pressure therein; means actuable by said holding means for opening the port valve when a length of said strip is held against said window; and, means motivated by said film strip for automatically locking said winding means upon the stationing of a length of said strip in the exposure position.

8. A cassette unit comprising a vacuum cassette and a mobile carriage, said carriage comprising a housing, an elevator platform upon which said cassette is mounted, said platform having depending legs telescopically received within said housing; means for raising and lowering said platform, said means including an operating handle exteriorly of said housing and means within said housing for counter-balancing said platform, legs and cassette, a conduit extending through said platform into said housing, a conduit within said housing, said first-mentioned conduit having one end terminating in a suction port in said cassette unit and telescopically slidably, sealingly engaging the conduit in said housing, a suction pump in said housing for educting air through said conduits from said cassette so as to establish a reduced pressure within said cassette, said cassette having provision for handling film in the form of a long strip of sensitized material and for exposing successive lengths of said strip to X-rays and comprising a casing having an X-ray permeable exposure window of a thin, flexible nature, an intensifying screen for holding a length of said strip stationed in the exposure position against said window, means for moving said intensifying screen into and out of its holding position, valve means for opening and closing said suction port in response to the movement of said screen, winding reels within said casing for storing said film strip, means for winding said film strip from one of said reels to the other, means motivated by said film strip for automatically locking said winding means upon the stationing of a length of said strip in the exposure position; and, manually operated means for releasing said locking means.

FRANK T. POWERS.